No. 664,530. Patented Dec. 25, 1900.
J. P. BROWN.
EDGING DEVICE.
(Application filed Oct. 1, 1900.)
(No Model.)
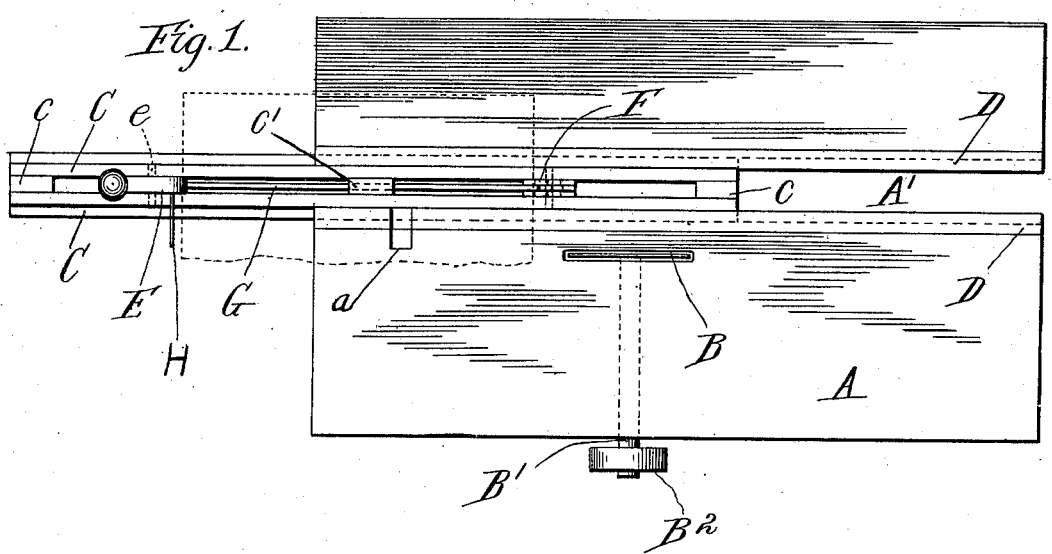
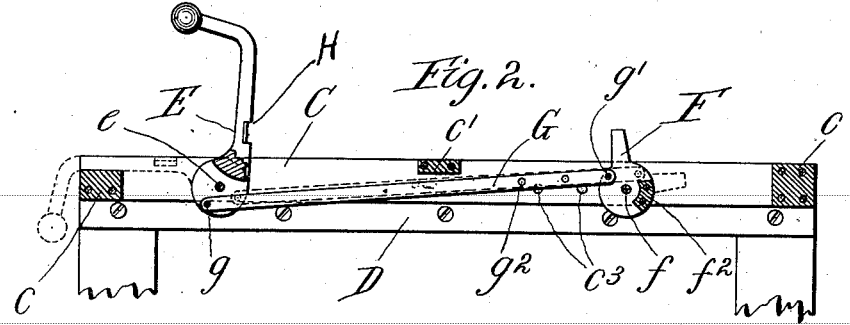
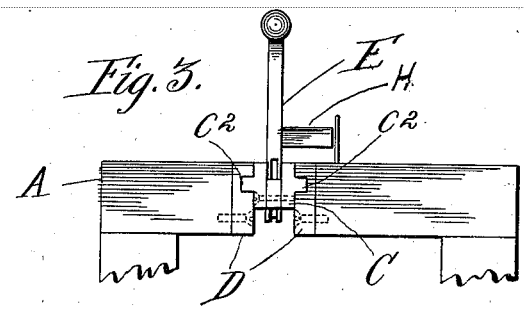
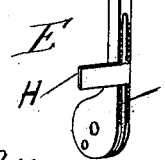
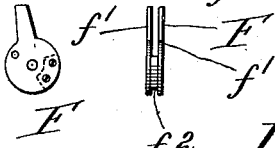
Witnesses:
William L. Hall
Dorothy E. Marmon
Inventor:
John P. Brown
by Poole & Brown
his attorneys
THE NORRIS PETERS CO., PHOTO-LITHO., WASHINGTON, D. C.

UNITED STATES PATENT OFFICE.

JOHN P. BROWN, OF CHICAGO, ILLINOIS.

EDGING DEVICE.

SPECIFICATION forming part of Letters Patent No. 664,530, dated December 25, 1900.

Application filed October 1, 1900. Serial No. 31,675. (No model.)

*To all whom it may concern:*

Be it known that I, JOHN P. BROWN, of Chicago, in the county of Cook and State of Illinois, have invented certain new and useful Improvements in Edging Devices; and I do hereby declare that the following is a full, clear, and exact description thereof, reference being had to the accompanying drawings, and to the letters of reference marked thereon, which form a part of this specification.

This invention relates to a novel device for edging lumber preparatory to matching same; and the invention consists in the matters hereinafter set forth, and more particularly pointed out in the appended claims.

My invention may be embodied in an attachment for an ordinary sawing-machine comprising a flat saw-table and a circular rip or edging saw projecting upwardly therethrough, the saw-table being cut away to receive the attachment and said attachment being so made that when the saw is not used as an edging-saw all the operative parts of the device are located at or below the plane of the saw-table, so as not to interfere with the usual operation of the saw. Moreover, the invention may be embodied in a machine constructed for edging purposes alone.

In the drawings, Figure 1 is a plan view of a saw-table provided with my edging attachment. Fig. 2 is a longitudinal section thereof with the carriage moved inwardly from the position shown in Fig. 1. Fig. 3 is an end view of the parts shown in Fig. 2. Fig. 4 is a perspective view of the operating-lever detached from its associated parts. Figs. 5 and 6 are end and side elevations, respectively, of a gripping-lever which coöperates with the operating-lever to lock a board in place on the device.

As shown in said drawings, A designates a saw-table, which may be of any usual or preferred construction; B, a circular rip or edging saw projecting upwardly through a slot in the table; B', an arbor on which said saw is mounted, and $B^2$ a pulley through which rotary motion is given to the arbor.

My improved edging attachment consists, essentially, of a carriage which travels in a path at one side of and parallel with the saw B and constructed to hold a board to be edged firmly at the level of the upper surface of the saw-table and to guide the board accurately to the saw as the same is moved forward by the carriage, whereby after the board has been locked on the carriage no special skill or attention is required from the operator to guide the same to the saw to make a straight cut.

The carriage consists, as herein shown, of two parallel bars C C, connected together by interposed blocks c, located between the ends thereof, and an intermediate block c'. Said blocks and bars are connected by screws in the manner shown in Fig. 2. The bars are separated a distance from each other, thereby providing a longitudinal space between the same for the location of the devices for holding the board on the carriage. The carriage fits and slides in a groove A', formed in the saw-table, and the bars C are provided on their outer lateral surfaces with tongues $c^2$, adapted to engage guide-grooves stationary with the adjacent edges of the table. When the device is formed as an attachment to be applied to a sawing-machine, said grooves are formed in longitudinal guide-rails D D, which are secured to the proximate margins of the cut-away portions A' of the table by screws or like means, as shown in Figs. 2 and 3; but when said device forms a permanent part of the saw-table said grooves may be formed in the proximate edges of the said cut-away portion A' and without the intervention of the guide-rails D. The parts described are so constructed and arranged that the upper surfaces of the carriage-bars C C are located in the plane of the upper surface of the saw-table, so that when the machine is to be used for other purposes than edging lumber the device presents no obstructions which rise above the level of the table.

The locking devices by which the board is held in position on the carriage consists of a lever E, pivoted at its lower end between the carriage-bars adjacent to one end of the carriage, a second lever F, similarly pivoted between the carriage-bars adjacent to the other end of the carriage, and a connecting-rod G, extending between and pivoted, respectively, at its opposite ends to the levers E F, whereby movement of one of said levers will cause a corresponding and desired movement of the other lever. The lever E is elongated and constructed to serve as an operating-lever to lock the board to the carriage and release the same therefrom. Said levers E F are pivoted to the carriage through the medium of transverse pivot-pins $e\,f$, secured at their opposite ends to the carriage-bars and passing through the levers. The connecting-rod G is pivoted at its opposite ends, respectively, to the levers E F through the medium of pivot-pins $g\,g'$. Said connecting-rod is pivoted to the lever E at a point below its fulcrum and is pivoted to the lever F at a point above its fulcrum $f$, whereby the lever E is one of the first class and the lever F one of the second class. With this construction when the lever E is swung toward the pivot of the lever F it will cause the free end of the lever F to swing toward the lever E, so that when a board is placed on the carriage between said levers and the lever E swung against the adjacent end margin of the board the lever F is swung against the opposite end margin of the board and said board clamped firmly on the carriage between the levers. Desirably both of said levers are provided with laterally-separated knife-edges to engage the board. The lever F is conveniently made of two similar parts $f'\,f'$ and an interposed block $f^2$, the three parts being joined by screws, as shown in Figs. 5 and 6. The contact-faces of the lever E for this purpose is shown as provided with a groove $e'$, at the sides of which the knife-edges are formed. The construction of the lever F affords between the parts thereof space for the location of the pivoted end of the connecting-rod G, and the lever E for this purpose is provided at its lower end with a groove, within which the adjacent end of the rod is pivoted, said spaces or grooves permitting free movement of the rod with respect to said levers.

In order to provide for different lengths of lumber, the carriage-bars are provided with a plurality of pivot-apertures $c^3$, Fig. 2, to permit the distance between the levers E and F to be varied, and the connecting-rod is provided with corresponding apertures $g^2$ for engagement of the lever F therewith.

It will be observed by reference to Fig. 2 that the levers E and F may be thrown down below the surface of the carriage, as indicated in dotted lines in Fig. 2, the connecting-block $e$, adjacent to the lever E, being cut away on its top surface to receive said lever. When the levers are in the position so indicated in dotted lines, all parts of the device are flush with the surface of the table, so that said table may be used for the usual purposes of a sawing-machine.

The lever E is desirably provided with a gage H, extending laterally toward the saw, with its outer end just inside of the plane of the saw, and which enables the operator to adjust the board in position on the carriage to permit the proper amount of stock to be cut from the board. The guide-rail and table on the side of the lever adjacent to the gage are provided with a groove $a$ to receive the gage when the parts are in the positions indicated in dotted lines in Fig. 2.

The carriage is shown in Fig. 1 in the position which it occupies when a board is to be locked thereto preparatory to moving the same toward the saw. The carriage and board are moved toward the saw by pressure applied to the lever E, it being observed that the pressure due to the resistance of the saw is sufficient to maintain the board locked in position on the carriage, the pressure of course increasing as the resistance increases.

It will be evident from the foregoing that the work of edging lumber by the use of my device may be accomplished by persons not possessing special skill as free-hand sawyers and that the only skill required in the work is that necessary to first adjust the board to the saw. The use of the gage H obviously facilitates such initial adjustment, so that a person possessing little skill as a sawyer may by the use of my device do the work which has heretofore required special skill. Moreover, by reason of the fact that a board may be accurately edged by a single cut with the use of my device, which frequently requires in free-hand sawing a number of cuts, my device is economical both with respect to the sawing of lumber and the time of the sawyer.

I claim as my invention—

1. An edging device comprising a movable carriage, two gripping-levers projecting upwardly therefrom and designed to engage the opposite margins of a board, and means for simultaneously swinging said levers into and out of engagement with a board, said parts being constructed to permit the levers to be thrown downwardly below the level of the carriage when the device is not in use.

2. An edging device comprising two parallel guide-rails, a carriage supported and sliding on said rails, two gripping-levers projecting upwardly from said carriage and designed to engage the opposite margins of a board, and means for simultaneously swinging said levers into and out of engagement with a board, said parts being constructed to permit the levers to be thrown downwardly below the level of the carriage when the device is not in use.

3. An edging device comprising a movable carriage, provided with a longitudinal space, two upwardly-projecting gripping-levers pivoted to said carriage in said space and constructed to engage the opposite margins of a board, and a connecting-rod pivoted at its opposite ends to said levers in such manner that both levers are simultaneously swung into and out of engagement with the board, said levers and connecting-rod being constructed to be thrown downwardly into said longitudinal space below the upper surface of the carriage.

4. An edging device comprising a movable carriage, two gripping-levers pivoted to the carriage and projecting at their upper ends above the carriage, and designed to engage the opposite margins of a board, a connecting-rod pivoted at its opposite ends to said levers, and means for varying the distance between said levers.

5. An edging device comprising a movable carriage, two gripping-levers pivoted to the carriage and projecting at their upper ends above the carriage, said levers being designed to engage the opposite margins of a board, a connecting-rod pivoted at its opposite ends to said levers, one of said levers being detachably connected with the carriage and designed to be moved toward and from the other lever, and the actuating-rod having a corresponding detachable engagement with said lever.

6. An edging device comprising a movable carriage, two gripping-levers pivoted to the carriage and projecting at their upper ends above the carriage, said levers being designed to engage the opposite margins of a board, a connecting-rod pivoted at its opposite ends to said levers, in such manner as to simultaneously swing the levers into and out of engagement with the board, one of said levers being constructed to form an operating-handle and provided with a gage projecting laterally therefrom.

7. The combination with a saw-table provided with a cut-away space or groove at the side of and parallel with the plane of the saw, of an edging device comprising a carriage which is movable in said groove and flush at its upper surface with the upper surface of the table, two gripping-levers pivoted to said carriage and projecting above the upper surface of the same, and constructed to engage the opposite margins of a board, and a connecting-rod pivoted at its opposite ends to said levers and in a manner to give equal and opposite movements to the levers, said levers being constructed to be thrown downwardly below the plane of the upper surface of the saw-table when the attachment is not in use.

In testimony that I claim the foregoing as my invention I affix my signature, in presence of two witnesses, this 15th day of September, A. D. 1900.

JOHN P. BROWN.

Witnesses:
TAYLOR E. BROWN,
WILLIAM L. HALL.